(No Model.)

E. S. PIPER.
BICYCLE STALL.

No. 597,510. Patented Jan. 18, 1898.

Witnesses
W. J. McMillan
Thos. E. Robertson

Inventor
Edward Spencer Piper
By Ridout & Maybee,
Attorneys.

UNITED STATES PATENT OFFICE.

EDWARD SPENCER PIPER, OF TORONTO, CANADA.

BICYCLE-STALL.

SPECIFICATION forming part of Letters Patent No. 597,510, dated January 18, 1898.

Application filed March 15, 1897. Serial No. 627,626. (No model.)

*To all whom it may concern:*

Be it known that I, EDWARD SPENCER PIPER, of the city of Toronto, in the county of York and Province of Ontario, Canada, have invented a certain new and Improved Bicycle Lock-Stall, of which the following is a specification.

The object of the invention is to provide a neat and effective bicycle-stall which may be folded against the wall when not in use, but which is so shaped and arranged that its loop engages with the wheel of a bicycle when placed on end against a wall so as to hold it at three points which are not on the same straight line and thus overcome all tendency in the bicycle to wabble or become displaced, the loop being automatically held so as to engage with the wheel in a substantially horizontal position when in operative position; and it consists, essentially, of a loop hinged to a bracket fixed on the wall and bent at the end where it engages with the tire and operating between spring-jaws which grip the loop when raised into operative position, as hereinafter fully described and definitely claimed.

Figure 1:
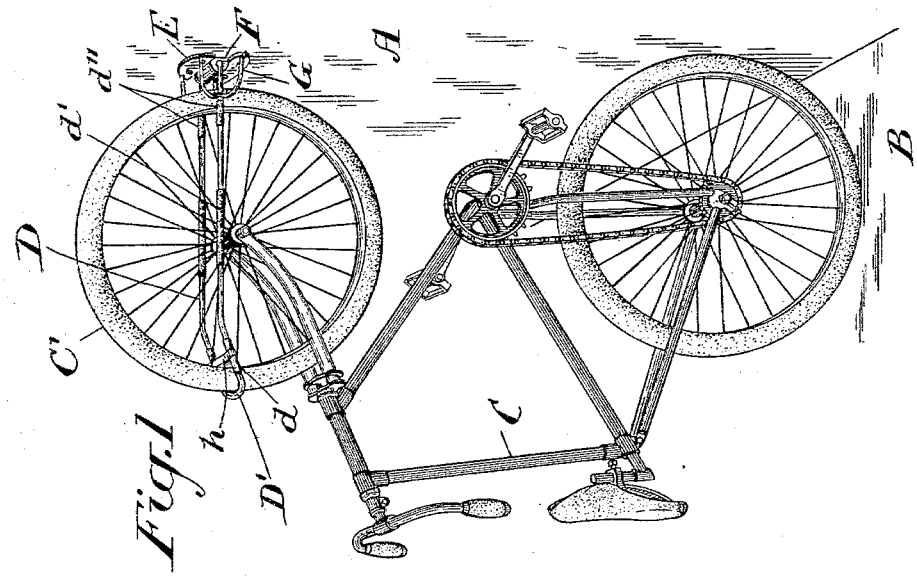
Figure 2:
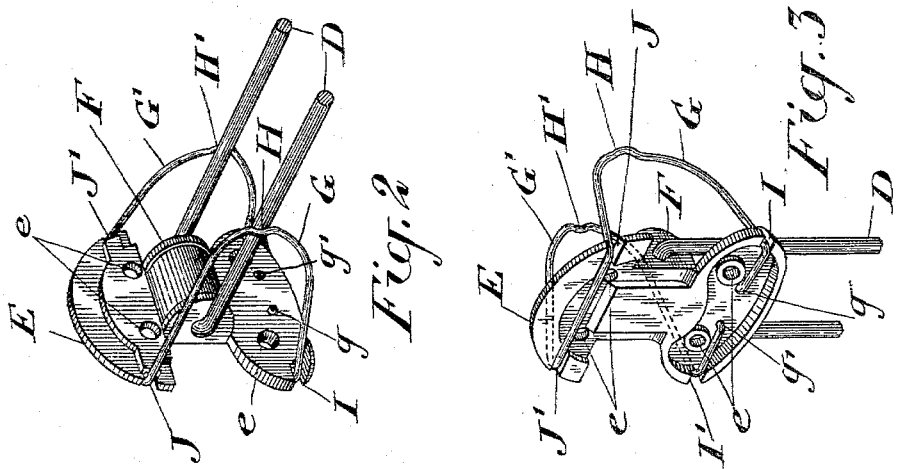
Figure 3:
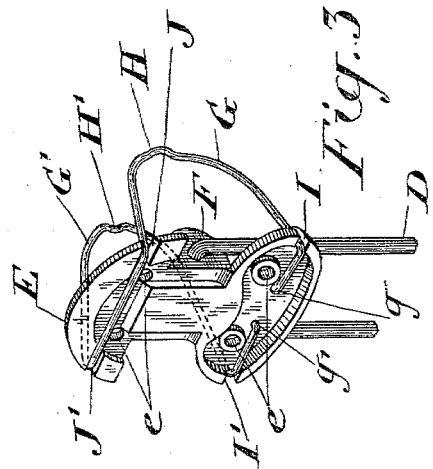

Figure 1 is a perspective view of a bicycle held in place against a wall by my device. Fig. 2 is an enlarged perspective front view of my device with part of the loop broken away, which is held in operative position by the spring-jaws, as is also indicated in Fig. 1. Fig. 3 is an enlarged perspective rear view of my device with part of the loop broken away and hinged down to the position it assumes against the wall when not in use.

In the drawings like letters of reference indicate corresponding parts in the different figures.

In Fig. 1, A is the side wall, and B is the floor. C is a bicycle standing on end on the driving-wheel and secured to the wall by my device, which is fixed to the wall at a suitable height to engage with the front wheel C' when the bicycle is in the position indicated. D is a loop preferably made of metal and which is hinged to the bracket E on the wall. This loop when in operative position, as indicated in the drawings, is bent downwardly at the end at D', which engages with that part of the rim of the wheel which is farthest from the wall. $d\ d'\ d''$ are pieces of rubber tubing covering the loop D in the places indicated, so as to afford a suitable bearing for the rim of the wheel as well as for that part of it which bears against the spokes. It will be seen that owing to the downward bend of the loop when in operative position these points of contact with the wheel are not in a straight line, and this form of bent loop is specially adapted to prevent wabbling or displacement of the bicycle when placed in its stall against a wall in the manner indicated in Fig. 1.

The details of construction of my device are further illustrated in the enlarged details in Figs. 2 and 3 and may be referred to as further illustrating the device shown in Fig. 1. The bracket E is secured to the wall preferably by screws or bolts which pass through the holes $e$, formed therein. In Fig. 3 the lower holes are preferably provided with a collar, as indicated, to afford additional bearing for the screw or other fastener.

In Fig. 2 my device is shown in the operative position indicated in Fig. 1, in which the loop is shown journaled in the journal F, formed on the bracket. The ends of the loop are bent, so that they may be sprung into their place within the journal. Being thus journaled, the loop is free to be moved up, so as to pass over the top of the wheel when raised into the position indicated in Fig. 1 and moved downwardly into the position indicated in Fig. 3 when the device is not in use. By hinging down the loop flat against the wall it may be conveniently put out of the way when the bicycle is not in its stall. The spring-jaws G G' are attached to the bracket preferably in the method indicated in Figs. 2 and 3. These jaws are made of spring-wire, one end of which $g$ passes through a hole from the rear of the bracket and then passes through the notch I, so as to form the jaw in which the loop-seat H is formed. It is then carried backwardly through the notches J J', formed in the bracket, so as to form the other jaw G', thence passing, as indicated, through the notch I', its end being bent at $g'$, so as to pass through and be secured to the bracket. It will be noticed that the jaws G G' are so shaped as to approach one another toward the end in which the loop-seat is located, so that as the loop is raised from the position shown in Fig. 3 to its operative position the sides of it bear against the jaws G G', which exert an inward pressure on the loop until it reaches the loop-seat H H', where it is sprung into place after it has become engaged with the bicycle-wheel.

If it is designed to hold the bicycle securely in place, so that it cannot be removed from its stall, I have provided a hasp $h$, (indicated in Fig. 1,) which embraces both sides of the loop and may be held in place by a small padlock, so that it is impossible to detach the bicycle from its stall without unlocking the padlock.

What I claim as my invention is—

1. In a bicycle-stall, a bracket suitably fixed to a wall, in combination with a loop journaled thereon and adapted to embrace a bicycle-wheel; and spring-jaws arranged on either side of the loop so as to grip and retain it when raised to operative position, substantially as specified.

2. A bicycle-stall containing the following instrumentalities: the bracket E, provided with notches I, I', and J, J'; the loop D, with bent end D'; the loop-journal F; the spring-jaws G, G', provided with loop-seats H, H', and so secured to the bracket as to afford inward pressure on the loop when raised to operative position, substantially as specified.

3. In a bicycle-stall, the combination of loop D, provided with bent end D', and rubber tubing $d$, $d'$, $d''$ at the contact-points with the bicycle-wheel when in place; the bracket E, provided with notches I, I', and J, J', to receive the wire of the spring-jaws; the loop-journal F; the spring-jaws G, G', provided with loop-seats H, H'; the seated ends gradually approaching each other, the jaws being secured to the bracket by passing the spring-wire through the notches I, I', and J, J', and the bent ends $g$, $g'$, through holes in the bracket, substantially as specified.

Toronto, March 6, 1897.

EDWARD SPENCER PIPER.

In presence of—
T. ERNEST,
W. E. CLENDANIEL.